United States Patent [19]
Atwood

[11] 3,899,275
[45] Aug. 12, 1975

[54] ROUNDER FOR DOUGH

[76] Inventor: Harold T. Atwood, 14152 Irving Ave., Dolton, Ill. 60619

[22] Filed: May 28, 1974

[21] Appl. No.: 473,687

[52] U.S. Cl. ................................................ 425/333
[51] Int. Cl.² .......................................... A21C 1/14
[58] Field of Search ........................... 425/332, 333

[56] References Cited
UNITED STATES PATENTS
1,152,348  8/1915  Streich........................... 425/333 X
1,192,973  8/1916  Allison............................... 425/333
FOREIGN PATENTS OR APPLICATIONS
226,622  3/1963  Austria .............................. 425/333

*Primary Examiner*—Francis S. Husar
*Assistant Examiner*—David S. Safran

[57] ABSTRACT

A spiral ramp is rigidly secured to the outer wall of a tubular cylinder that is mounted in fixed position within a rotatable cylindrical drum with the outer edges of the ramp contiguous to the inner wall surface of the drum. The ramp is inclined downwardly and outwardly across its width to urge pieces of dough that are on the ramp against the inner wall surface of the drum. A dispenser plate mounted adjacent the bottom of the cylinder moves pieces of dough dropped through the cylinder on to the ramp, and rotation of the drum moves the dough upwardly on the ramp to the upper edge of the cylinder and drum. Constant pressure of the wall of the drum and the ramp on the dough rounds the dough as it is moved to the top of the drum. The ramp stops at the upper edge of the drum and when the ball of dough reaches the top of the rounder it drops over the edge of the drum on to a suitable conveyor.

1 Claim, 7 Drawing Figures

PATENTED AUG 1 2 1975

3,899,275

SHEET 1

PATENTED AUG 12 1975 3,899,275

SHEET 2

ROUNDER FOR DOUGH

BACKGROUND OF THE INVENTION

1. Field of the Invention

The present invention is concerned with simple apparatus capable of rounding individual pieces of dough rapidly without requiring adjustments for every variation in the size of the dough to be rounded.

2. Description of the Prior Art

Prior to applicant's present invention irregular pieces of dough were rounded by the interaction of a conveyor belt and an adjustable guide member as exemplified in applicant's prior U.S. Pat. No. 3,448,697 issued June 10, 1969.

SUMMARY OF THE INVENTION

The present invention relates to a vertically disposed stationary tubular cylinder mounted in a rotatably mounted cylindrical drum and having a spiral ramp curved downwardly across its width to cooperate with the inner wall surface of the drum to cause pieces of dough positioned on the ramp to be confined between the surface of the ramp and the adjacent inner wall surface of the drum. The apparatus is capable of rounding pieces of dough very rapidly without requiring any adjustment if the size of the pieces of dough being rounded is changed. The tubular cylinder and the rotatable drum may be readily separated for cleaning purposes.

DESCRIPTION OF THE PREFERRED EMBODIMENT

Figure 1:
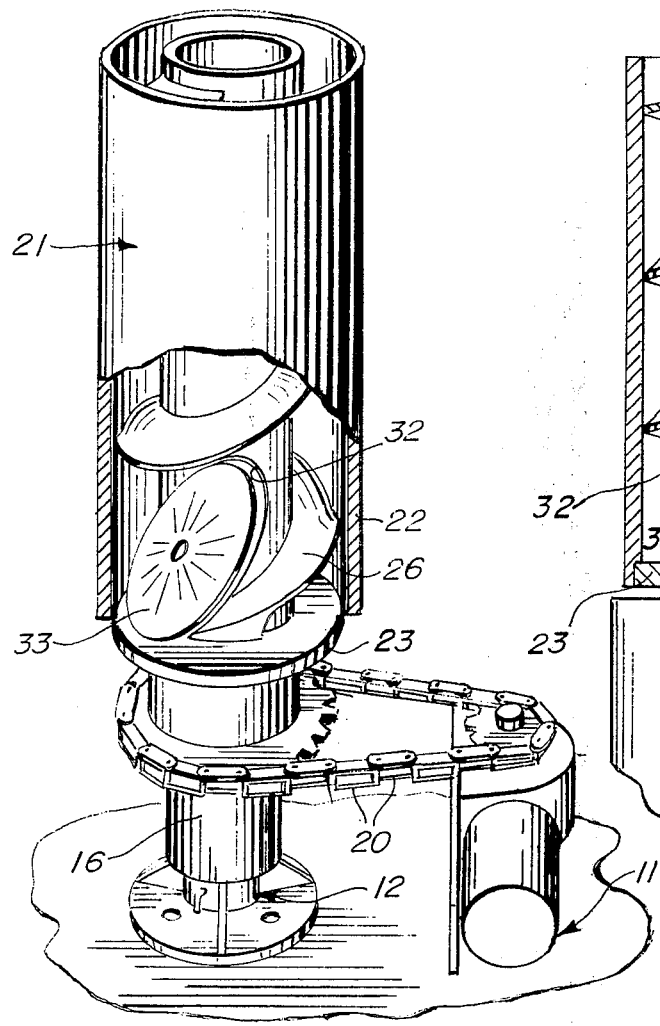
FIG. 1 is a fragmentary perspective view of the rounder with a portion of the housing broken away to show the interior structure.
Figure 2:
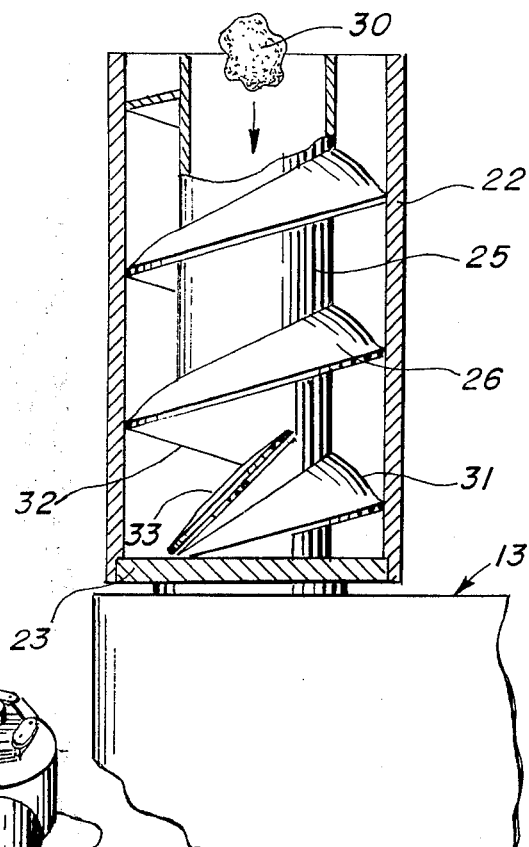
FIG. 2 is a view, partly in section and partly in elevation, with the upper end of the cylinder broken away, showing a piece of dough as it is dropped into the cylinder.
Figure 3:
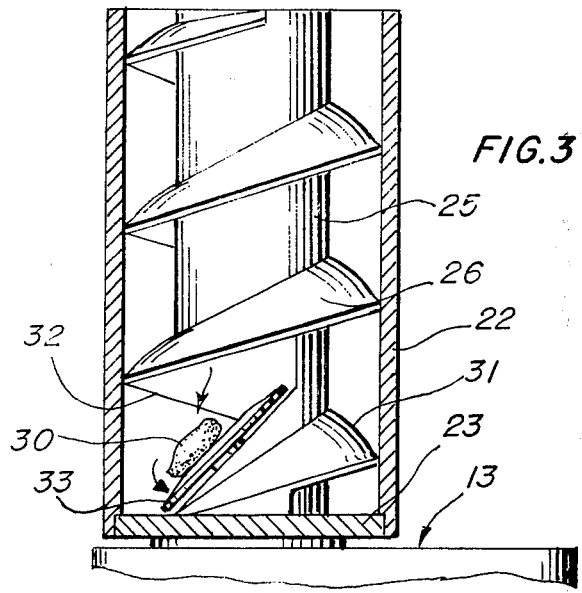
Figure 4:
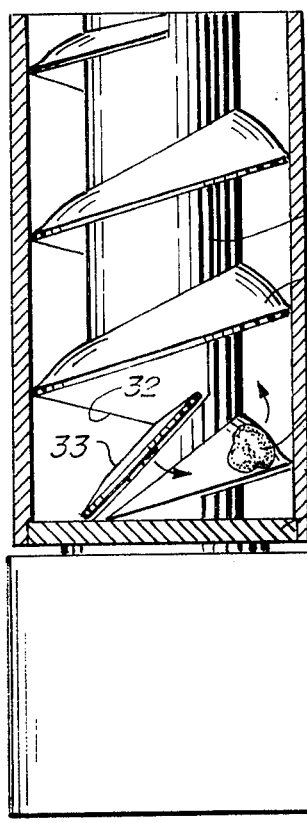
FIGS. 4, 5 and 6 are views, similar to FIG. 3, showing the piece of dough as it moves upwardly along the ramp.
Figure 5:
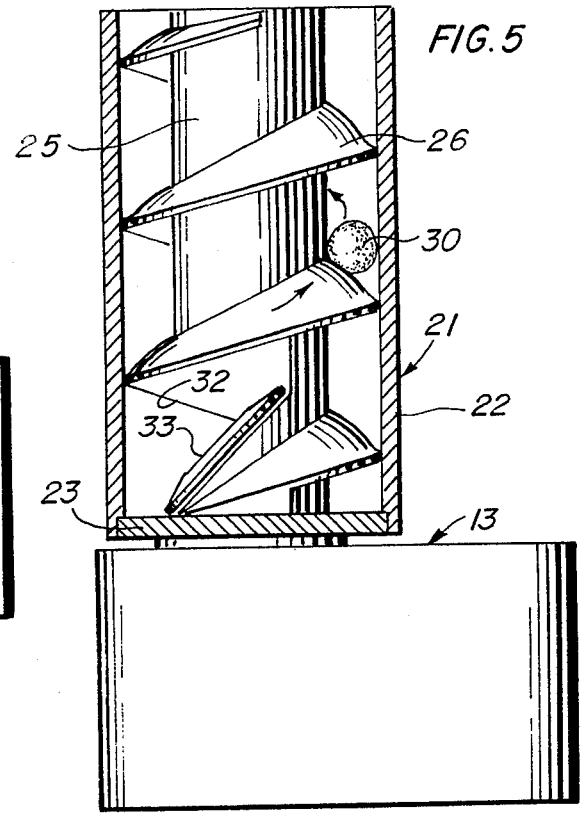
Figure 6:
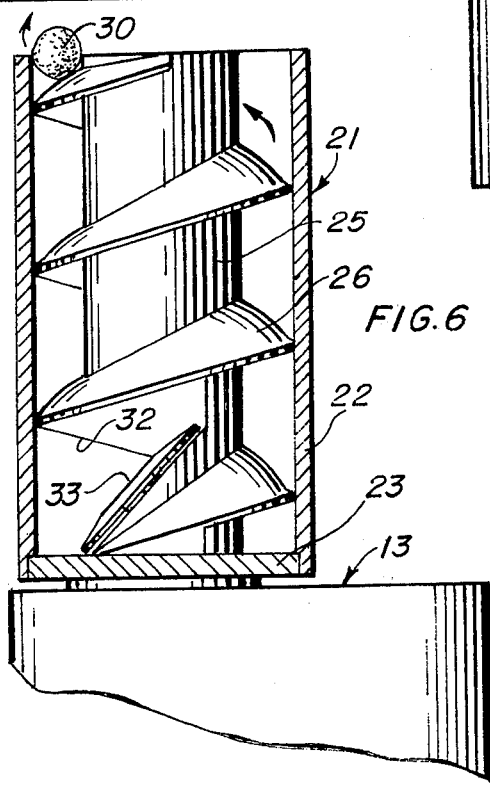
Figure 7:
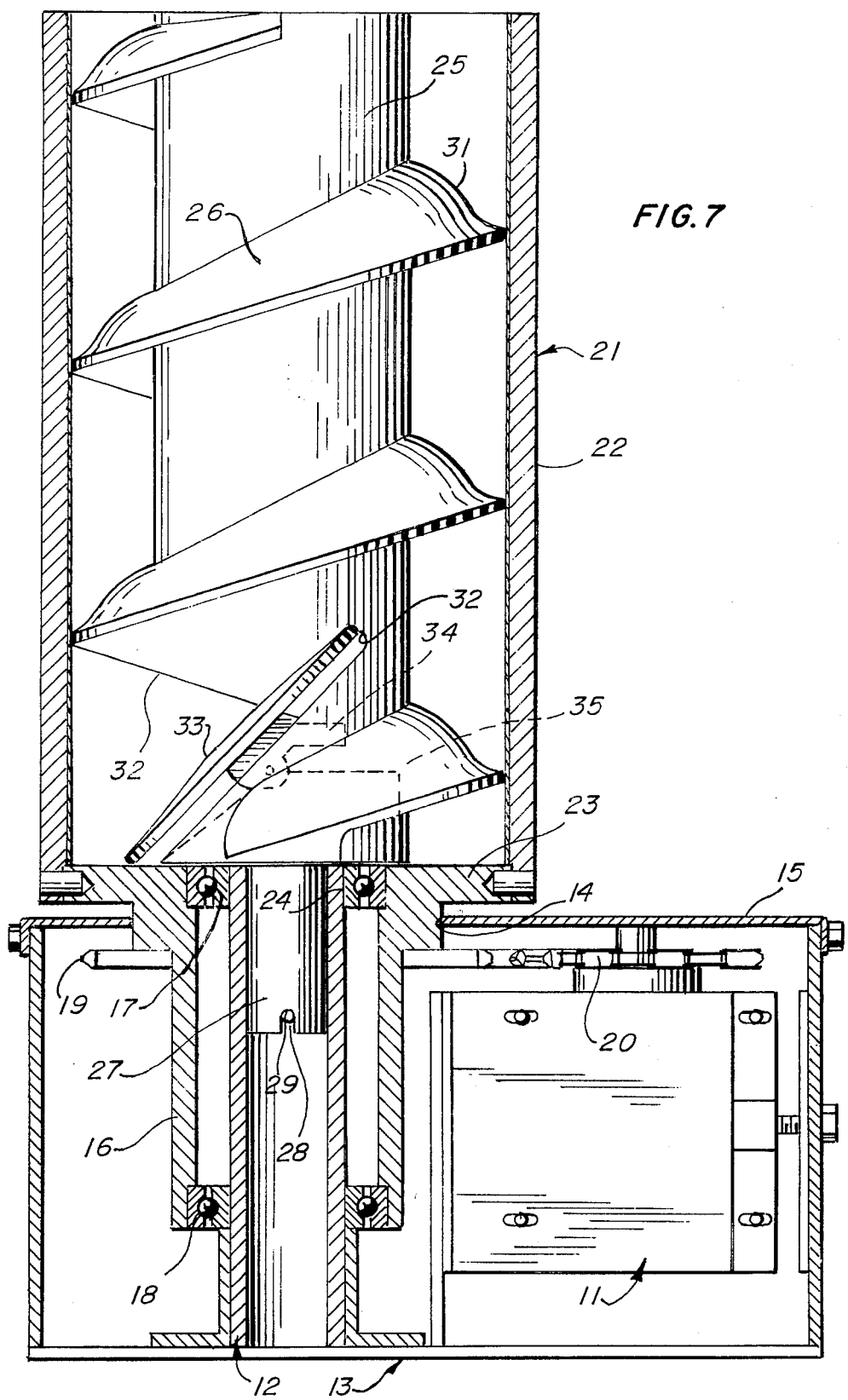
FIG. 7 is a view, partly in section and partly in elevation, showing how the cylinder is mounted in the housing.

In the drawings, a motor 11 and an upright post 12 are housed in side by side relationship within a cabinet 13. The upper end of the post projects through an opening 14 in the top wall 15 of the cabinet. A tubular sleeve 16 encircling the post 12 fits within the opening 14. Suitable bearing surfaces 17 and 18 are provided between the ends of the sleeve and the post to permit rotation of the sleeve relative to the post. A sprocket 19 rigidly secured to the sleeve 16 is engaged by a chain 20 driven by the motor 11 to rotate the sleeve.

The upper end of the sleeve 16 supports a rotatable drum 21 in upright position in vertically spaced relationship to the top wall 15 of the cabinet. The drum comprises a cylindrical wall 22 and a bottom wall 23. The bottom wall 23 is rigidly secured to the upper end of the sleeve 16, but may be integral therewith, if desired. The rigid securement of the bottom wall 23 to the sleeve 16 causes the drum to rotate when the chain drive rotates the sleeve. The bottom wall 23 has an opening 24 into which the upper end of the post 12 fits with sufficient clearance to permit the drum to rotate freely relative to the post.

A tubular cylinder 25 having a spiral ramp 26 extending outwardly from its cylindrical wall is positioned within the drum 21. A shaft 27, rigidly secured to the lower end of the cylinder 25, depends into the upper end of the post 12 to provide stability for the cylinder. The lower end of the shaft 27 may be provided with a transverse notch 28 adapted to fit over a pin 29 traversing the post 12 to support the cylinder at the desired height. The pin and notch connection permits the cylinder to be readily removed from the drum for cleaning purposes.

When the cylinder 25 is positioned within the drum the outer edge of the spiral ramp engages the inner wall surface of the drum so that any pieces of dough 30 positioned on the ramp are confined within the space between the outer wall of the cylinder and the inner wall surface of the drum. The spiral ramp is curved downwardly across its width, as indicated at 31, for a purpose hereinafter disclosed.

In commercial operation, a dough divider (not shown) is positioned adjacent the rounder, and pieces of dough discharged from the divider are dropped into the open upper end of the cylinder 25. The lower end of the cylinder 25 is cut away adjacent the lower end of the ramp 26, as indicated at 32, to permit pieces of dough 30 dropped through the open top of the cylinder 25 to be positioned on the lower end portion of the spiral ramp by a dispenser plate 33. The plate 33 is rotatably mounted on a bracket 34 pivotally mounted on a plate 35 rigidly secured to the lower end portion of the cylinder adjacent the cut away portion 32. The plate 33 has a larger diameter than the cylinder 25, and is positioned to intercept any pieces of dough dropped through the cylinder. The dispenser plate is angularly disposed relative to the bottom of the drum, and the lower portion of its rim frictionally engages the bottom wall 23 of the drum so that it is rotated about its own axis as the drum is rotated. The rotation of the plate 33 cause it to throw pieces of dough falling on to the plate on to the lower end of the ramp 26.

The rounder of the present invention may be used with pieces of dough of various sizes, and the transverse configuration of the ramp causes each piece of dough positioned on the ramp to move downwardly into engagement with the inner wall surface of the drum. As the drum is rotated the frictional engagement of the dough with the ramp and the inner wall surface of the drum moves the pieces of dough upwardly along the length of the ramp. The friction also kneads the dough as it moves upwardly on the ramp and the length of the ramp is designed to produce a rounded ball of dough of desired tightness at the top of the rounder. The upper end of the ramp terminates in the horizontal plane of the upper end of the drum, and continued rotation of the drum forces the rounded balls of dough over the top edge of the drum. A suitable conveyor (not shown) is positioned to receive the rounded balls of dough as they drop over the upper edge of the drum.

I claim:

1. A rounder for dough comprising a rotatably mounted vertically disposed cylindrical drum, a stationary tubular cylinder housed within said drum, said tubular cylinder having an open upper end and having a portion thereof broken away at its lower end, a vertically disposed spiral ramp projecting outwardly from said cylinder with its outer edge in engagement with the inner wall surface of said drum, said ramp being curved downwardly across its width to move pieces of dough positioned on said ramp into engagement with the inner wall surface of said drum, means for rotating said drum to move pieces of dough positioned on said ramp upwardly along the length of said ramp, and an angularly disposed dispenser plate rotatably mounted adjacent the lower end of said cylinder with the lower portion of its rim in frictional engagement with the bottom wall of said drum whereby rotation of said drum causes said dispenser plate to move pieces of dough dropped through said cylinder on to said ramp.

* * * * *